UNITED STATES PATENT OFFICE.

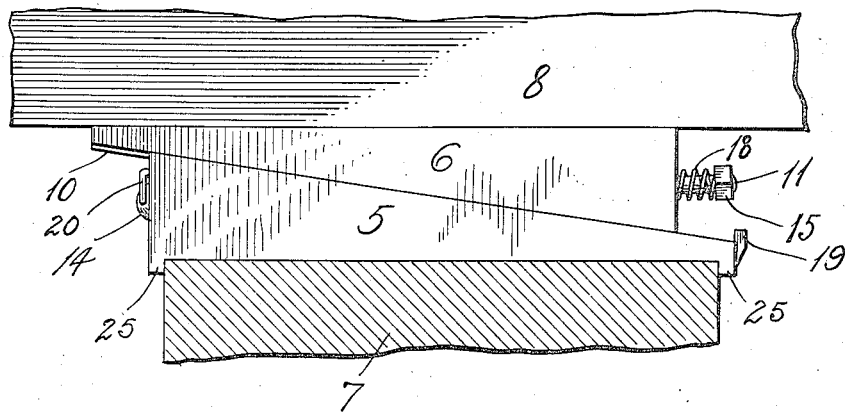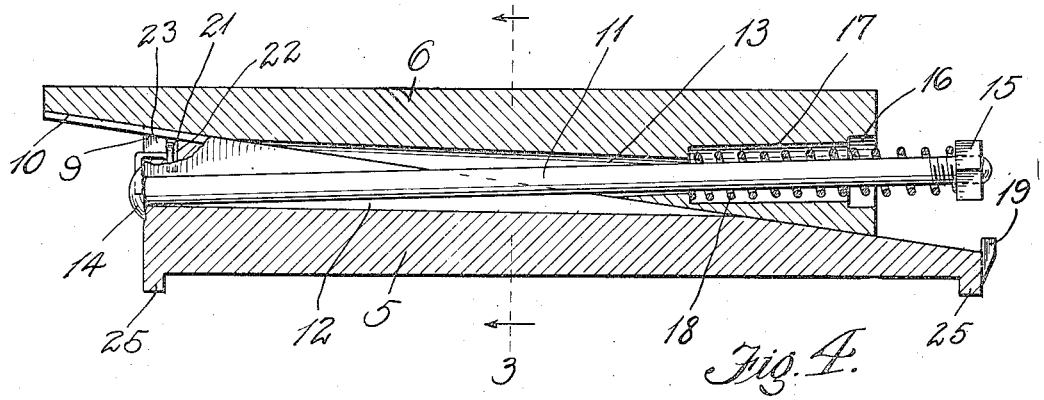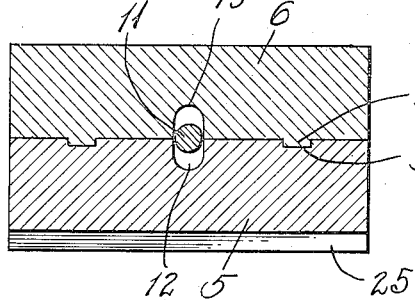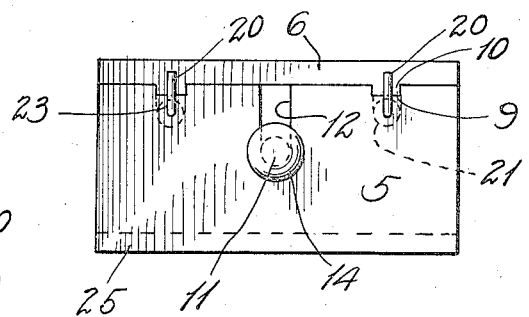

CHARLES W. KING, OF LOS ANGELES, CALIFORNIA.

WEDGE MECHANISM.

1,045,984.

Specification of Letters Patent.

Patented Dec. 3, 1912.

Application filed October 10, 1911. Serial No. 653,883.

*To all whom it may concern:*

Be it known that I, CHARLES W. KING, a citizen of the United States, residing at Los Angeles, in the county of Los Angeles and State of California, have invented new and useful Improvements in Wedge Mechanism, of which the following is a specification.

This invention relates to improvements in wedge mechanisms and particularly to expansible wedge mechanisms, the structure being such that the wedge device constructed in accordance with the invention is capable of automatically expanding to fill spaces or crowd tightly against articles or materials that are to be firmly held in place.

It is an object of the invention to provide an expansible wedge device which is applicable to parts which are liable to be jarred or vibrated so as to become loosened with respect to each other, the said wedge automatically expanding to take up any movement between the parts.

It is a further object of the invention to provide a wedge mechanism formed of wedge members adapted to move upon each other and connecting means interposed between them for causing one member to move upon the other.

In the accompanying drawing forming a part of this specification, Figure 1 is a side elevation of the improved wedge mechanism interposed between two timbers, beams or other devices. Fig. 2 is a longitudinal vertical central sectional view through the said wedge device. Fig. 3 is a transverse vertical sectional view taken upon the line 3—3 of Fig. 2. Fig. 4 is an end elevation of the wedge mechanism when the wedges are locked with respect to each other.
The details and features of the invention will now be more particularly described, reference being had to the said drawing in which 5 indicates a lower wedge member and 6 an upper wedge member, the said wedge members having their inclined faces opposed to each other and adapted to move upon each other, the top and bottom surface of said wedge members being preferably parallel.
The device is especially well adapted for the parts of a mechanism or structure of any kind which through one cause or another are liable to be jarred or shaken loose with respect to each other, the wedge automatically expanding to fill the space due to movement in the parts, and thus take up or prevent any further movement and lessen the liability thereto.

The device is so constructed that the lower wedge member 5 may rest upon a beam or other support 7 while the upper wedge member will engage the under surface of a beam, bar or other material or article as 8 with its upper surface. The inclined meeting surface of the wedge members are adapted to slide longitudinally upon each other and means is provided upon the face of the wedges for directing their movement, said means preferably consisting of grooves 9 formed longitudinally of the inclined face of the wedge member 5 and correspondingly arranged ribs or flanges 10 formed upon the under face of the member 6. The movement of the said wedge members with respect to each other will thus always be accomplished without the disarrangement of the parts or their getting out of alinement.

In order to make the wedge mechanism expansible a bolt 11 is mounted within the device, normally occupying recesses or grooves 12 and 13 in the opposing faces of the said members. The head 14 of the bolt engages the thickened end of the wedge member 5 while the other end of the bolt, which is screw threaded and provided with an adjustable nut 15, normally extends to or beyond the thickened end of the wedge member 6. When the wedge members are in locked position, the nut 15 is accommodated by counter-sunk recesses 16 formed in the other end of the said member 6. The said enlarged end of the member 6 is also further bored to form a recess 17 in which is mounted and shouldered a spiral spring 18. The spring is thus interposed between the inner end of the bore 17 and the inner face of the nut 15 tending to push the wedge member 16 upwardly upon the inclined face of the lower wedge member 5. The grooves 12 and 13 are of such shape as to permit the bolt 11 to accommodate itself to the changed positions of the wedge members. A stop 19 is provided at the small end of the member 5 to limit the movement of the wedge member 6 in that direction.

To facilitate the insertion of the wedge device in position between the parts, it is preferable to temporarily lock the same, and for this purpose revoluble hook members 20 are provided having enlarged portions or heads 21 formed at their inner ends which are inserted in recesses 22 provided in the thickened end of the member 5. The stems of said hooks extend outwardly through slots 23 in the wedge member 5 and their outer angular ends can be turned upwardly as shown in Fig. 4 so as to come opposite the small end of the member 6 and prevent the spring 18 from sliding the said member 6 upon the member 5. The hook members 20 may be made in a very simple form, usually struck from a single piece of material and can be loosely set up in place in the recesses 22 and grooves 23.

The device thus constructed is admirably adapted for insertion between parts that are likely to be jarred or loosened from time to time, the hooks 20 being turned upwardly for holding the parts in collapsed position when the wedge is to be inserted in place. After the wedge has been positioned between the parts to be held with respect to each other, the hook members 20 are turned downwardly and the spring 18 will force the members to slide upon each other until the space between said parts is filled. Any further tendency toward looseness or the separation of the parts between which the wedge is located, will cause the wedge to automatically operate to fill the space between said parts and thus tend to prevent and reduce vibration in said parts.

If desired one or both of the said members may be provided with means for positioning the device upon a support, beam or the like. Thus the part 5 is provided with end flanges 25 which overhang the supports 7 and prevent the wedge from slipping or jarring from place.

What I claim is:—

1. A wedge mechanism, comprising wedge members, a connecting bolt extending longitudinally through said members, and a spring carried by said bolt and normally tending to expand the wedge mechanism to automatically take up space between parts separated by said wedge mechanism.

2. A wedge mechanism, comprising wedge sections having a movable engagement with each other, a bolt interposed between said sections, and a spring mounted upon said bolt and engaging one of the sections, the mechanism being such that the wedge device will tend to be expanded whenever the parts between which it is placed will permit.

In witness that I claim the foregoing I have hereunto subscribed my name this 28th day of Sept., 1911.

CHARLES W. KING.

Witnesses:
E. STADEMAN,
EARLE R. POLLARD.